US012359608B2

United States Patent
Gharpure et al.

(10) Patent No.: US 12,359,608 B2
(45) Date of Patent: Jul. 15, 2025

(54) APPARATUS AND METHODS RELATED TO COOLANT DIVERTER VALVES

(71) Applicant: Perkins Engines Company Limited, Peterborough (GB)

(72) Inventors: Siddharth Gharpure, Peterborough (GB); Matthieu Guttinger, Birmingham (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 18/891,857

(22) Filed: Sep. 20, 2024

(65) Prior Publication Data

US 2025/0101903 A1 Mar. 27, 2025

(30) Foreign Application Priority Data

Sep. 22, 2023 (GB) .................... 2314596

(51) Int. Cl.
*F01P 11/16* (2006.01)
*B01D 53/94* (2006.01)
(Continued)

(52) U.S. Cl.
CPC .......... *F01P 11/16* (2013.01); *F01N 3/2066* (2013.01); *F01P 7/14* (2013.01); *F01P 11/029* (2013.01); *F01P 11/18* (2013.01); *B01D 53/9409* (2013.01); *B01D 2251/2067* (2013.01); *B01D 2258/012* (2013.01); *F01N 2610/02* (2013.01); *F01N 2610/11* (2013.01); *F01N 2610/1406* (2013.01); *F01N 2610/1446* (2013.01);
(Continued)

(58) Field of Classification Search
CPC combination set(s) only.
See application file for complete search history.

(56) References Cited

U.S. PATENT DOCUMENTS 6,955,141 B2   10/2005   Santanam et al.
9,540,987 B2    1/2017   Gonze et al.
(Continued)

FOREIGN PATENT DOCUMENTS

JP   2013217233 A   10/2013
JP   2014001681 A    1/2014
KR    102075137 B1   2/2020

OTHER PUBLICATIONS

European Extended Search Report for Europe Patent Appln. No. 24192907.4, mailed Oct. 14, 2024 (2 pgs).
(Continued)

*Primary Examiner* — Binh Q Tran

(57) ABSTRACT

A method and apparatus for fault detection of a coolant diverter valve. The coolant diverter valve is arranged in a coolant system to control flow of coolant from a coolant reservoir to a diesel exhaust fluid tank. At least a first sensor is provided for measuring the pressure and/or temperature of the coolant. During operation of the coolant diverter valve, as required from time to time, the coolant diverter valve is commanded to open by energising the coolant diverter valve and commanded to close by de-energising the coolant diverter valve. Based on readings from the first sensor a controller can determine if the coolant diverter valve has failed to close when the coolant diverter valve is de-energised.

20 Claims, 4 Drawing Sheets

(51) Int. Cl.
*F01N 3/20* (2006.01)
*F01P 7/14* (2006.01)
*F01P 11/02* (2006.01)
*F01P 11/18* (2006.01)

(52) U.S. Cl.
CPC ............... *F01N 2900/1808* (2013.01); *F01N 2900/1811* (2013.01); *F01P 2007/146* (2013.01); *F01P 2025/04* (2013.01); *F01P 2025/13* (2013.01)

(56) References Cited

U.S. PATENT DOCUMENTS

| | | | |
|---|---|---|---|
| 10,316,731 B2 | 6/2019 | Park et al. | |
| 10,704,454 B2 | 7/2020 | Lee | |
| 10,961,897 B2 | 3/2021 | Lee et al. | |
| 2013/0118155 A1* | 5/2013 | Domon | F01N 3/10 60/274 |
| 2015/0192046 A1* | 7/2015 | Gharpure | F01N 3/2066 60/317 |
| 2015/0275732 A1* | 10/2015 | Yi | F01N 3/2046 165/96 |
| 2017/0321582 A1* | 11/2017 | Nakao | B01D 53/9431 |
| 2018/0128140 A1 | 5/2018 | Park | |
| 2018/0209325 A1* | 7/2018 | Choi | E02F 9/0883 |
| 2020/0132022 A1* | 4/2020 | Monti | F02M 25/0224 |
| 2021/0131334 A1* | 5/2021 | Stephens | F01P 3/12 |
| 2022/0251988 A1* | 8/2022 | Kamei | B01D 53/9495 |
| 2023/0287823 A1 | 9/2023 | Singh et al. | |

OTHER PUBLICATIONS

Great Britain Search Report related to Application No. GB2314596.4; reported on Feb. 28, 2024.

* cited by examiner

APPARATUS AND METHODS RELATED TO COOLANT DIVERTER VALVES

CROSS-REFERENCE TO RELATED APPLICATION

This application claims priority under 35 USC §119 and the Paris Convention to Great Britain Patent Application No. 2314596.4 filed on Sep. 22, 2023

TECHNICAL FIELD

The present disclosure relates to apparatus for controlling the temperature of diesel exhaust fluid (DEF) in a DEF tank and to methods of fault detection of a coolant diverter valve (CDV).

BACKGROUND TO THE DISCLOSURE

It is known to provide diesel internal combustion engines with a source of diesel exhaust fluid (DEF) for injection into the exhaust system during operation. Typically, the DEF comprises an aqueous urea solution and the exhaust system is configured to inject the DEF into the exhaust flow upstream of a Selective Catalytic Reduction (SCR) module. Subsequently, a reaction between the catalyst of the SCR and the DEF convents NOx components of the exhaust flow to nitrogen and water.

The DEF may be stored in a DEF tank. In cold conditions the DEF within the DEF tank may increase in viscosity, turn slushy or even freeze. To prevent this, it is known to pass heated coolant fluid through a conduit that passes through the DEF tank so as to supply heat energy to the DEF within the DEF tank. In order to prevent over-heating of the DEF in the DEF tank it is important to control the flow of the heated coolant through the DEF tank. To achieve this, it is known to provide a valve, referred to as a coolant diverter valve (CDV), to control flow of the heated coolant along the conduit. Typically, such coolant diverter valves are required to be inexpensive and simple in design.

However, it has been found by the present applicant that such valves may become blocked with debris circulating within the coolant system. This debris may include, for example, particles such as metal particles, rust particles, flakes detached from portions of the engine such as the radiator, casting sand, or foreign bodies entering the coolant system during filling of the coolant fluid from time to time. Blockage of the valve may be a particular issue where the valve is, for example, a 2 way 2 position solenoid valve because such valves comprise orifices and clearances of a small size. In the event that the valve becomes blocked heated coolant may pass continuously through the DEF tank leading to overheating of the DEF which, in turn may result in shut down of the engine to prevent damage due to hot DEF. Hot DEF can decompose into ammonia or form deposits which can permeate and damage components.

SUMMARY OF THE DISCLOSURE

An embodiment of the present disclosure provides a method of fault detection of a coolant diverter valve, the method comprising:
  arranging the coolant diverter valve in a coolant system to control flow of coolant from a coolant reservoir to a diesel exhaust fluid tank;
  providing a first sensor for measuring the pressure and/or temperature of the coolant;
  operating the coolant diverter valve by, as required from time to time, commanding the coolant diverter valve to open by energising the coolant diverter valve and commanding the coolant diverter valve to close by de-energising the coolant diverter valve; and
  based on readings from the first sensor determining if the coolant diverter valve has failed to close when the coolant diverter valve is de-energised.

Another embodiment of the present disclosure provides an apparatus for controlling the temperature of diesel exhaust fluid in a diesel exhaust fluid tank, the apparatus comprising:
  a coolant reservoir containing coolant;
  a diesel exhaust fluid tank for holding an aqueous urea solution for injection into an exhaust system;
  a coolant diverter valve;
  coolant lines for circulating the coolant from the coolant reservoir via the coolant diverter valve and the diesel exhaust fluid tank and back to the coolant reservoir;
  a first sensor for measuring the pressure and/or temperature of the coolant; and
  a controller configured to:
    command the coolant diverter valve to open by energising the coolant diverter valve and command the coolant diverter valve to close by de-energising the coolant diverter valve;
    receive readings from the first sensor; and
    when the coolant diverter valve is commanded to close, based on the readings from the first sensor, determine if the coolant diverter valve has failed to close.

Another embodiment of the present disclosure provides a method of fault detection of a coolant diverter valve, the method comprising:
  arranging the coolant diverter valve in a coolant system to control flow of coolant from a coolant reservoir to a diesel exhaust fluid tank;
  operating the coolant diverter valve by, as required from time to time, commanding the coolant diverter valve to open by energising the coolant diverter valve and commanding the coolant diverter valve to close by de-energising the coolant diverter valve;
  determining if the coolant diverter valve has failed to close when the coolant diverter valve is de-energised based on detecting a position of a valve element of the coolant diverter valve based on detecting a location of a solenoid armature of the coolant diverter valve.

Another embodiment of the present disclosure provides an apparatus for controlling the temperature of diesel exhaust fluid in a diesel exhaust fluid tank, the apparatus comprising:
  a coolant reservoir containing coolant;
  a diesel exhaust fluid tank for holding an aqueous urea solution for injection into an exhaust system;
  a coolant diverter valve comprising a valve element movable by a solenoid armature;
  coolant lines for circulating the coolant from the coolant reservoir via the coolant diverter valve and the diesel exhaust fluid tank and back to the coolant reservoir;
  a controller configured to:
    command the coolant diverter valve to open by energising the coolant diverter valve and command the coolant diverter valve to close by de-energising the coolant diverter valve; and
    when the coolant diverter valve is commanded to close, based on detecting a location of the solenoid armature, determine if the coolant diverter valve has failed to close.

BRIEF DESCRIPTION OF THE DRAWINGS

One or more embodiments of the disclosure will now be described, by way of example only, with reference to the accompanying drawings in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "and/or" means "and" and "or" unless stated otherwise.

Figure 1:
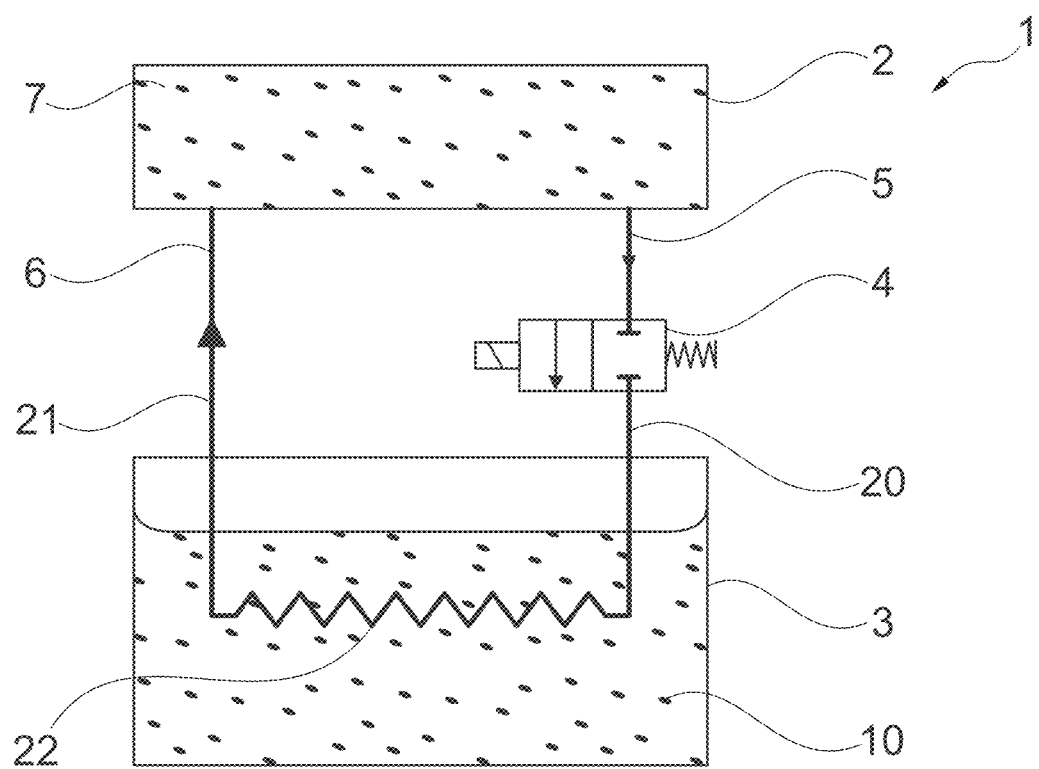
FIG. 1 is a schematic diagram of an apparatus comprising a coolant reservoir connected to a diesel exhaust fluid (DEF) tank via a coolant diverter valve (CDV)

The present disclosure relates generally to an apparatus 1 that comprises a coolant diverter valve (CDV) 4. The apparatus 1 may be coupled to or form part of an engine, for example a diesel internal combustion engine. FIG. 1 illustrates schematically an example of such an apparatus 1 known in the art.

The apparatus 1 comprises a coolant reservoir 2 comprising a coolant line outlet port 5, a diesel exhaust fluid (DEF) tank 3 for holding an aqueous urea solution 10 for injection into an exhaust system of the engine, a coolant line 20 for transferring a coolant fluid 7 discharged from the coolant reservoir 2 via the coolant line outlet port 5 to the DEF tank 3 to enable, in use, heat exchange between the coolant fluid 7 and the aqueous urea solution 10 contained in the DEF tank 3 and the CDV 4 located on the coolant line 20 for controlling flow of coolant fluid 7 along the coolant line 20 to the DEF tank 3.

The heat exchange may be achieved, for example, by passing the coolant fluid 7, which in use will have been heated by the engine, through an interior of the DEF tank 3 in for example a section of coiled conduit 22 that is supplied by the coolant line 20. The coiled conduit 22 may connect to a coolant return line 21 that may return the coolant fluid 7, directly or indirectly, to the coolant reservoir 7.

Figure 2:
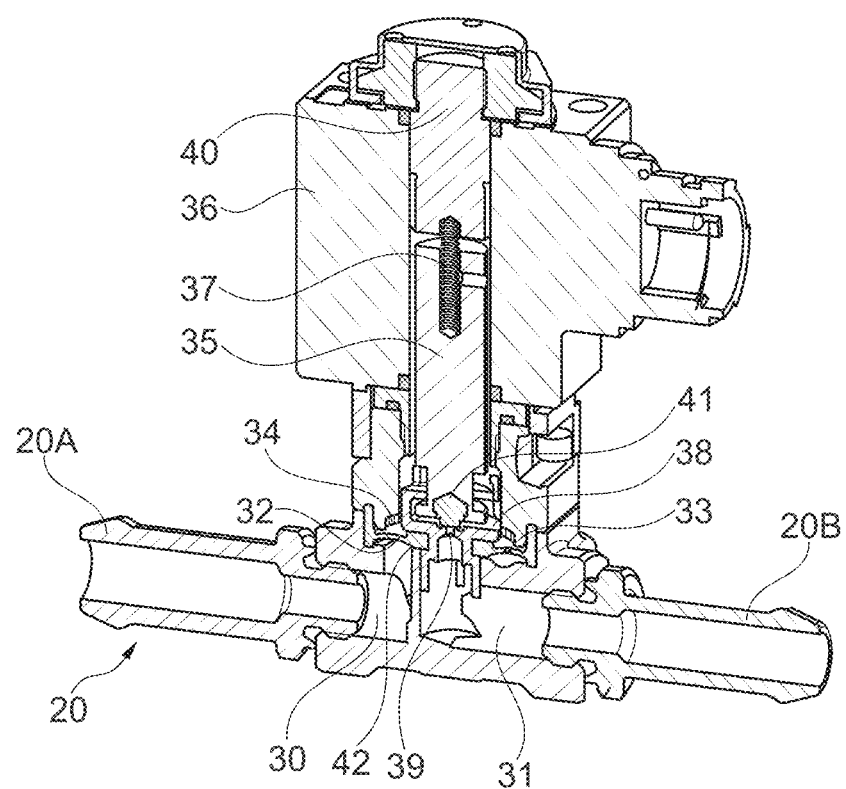
FIG. 2 is a sectioned perspective view through the CDV of FIG. 1.

It is known to use a solenoid valve as the CDV 4. An example of one such CDV 4 is shown, by way of example, in FIG. 2. The illustrated CDV 4 is a 2 way 2 position normally closed solenoid valve with assisted lift. An inlet 30 of the CDV 4 is connected to an incoming section 20A of the coolant line 20. An outlet 31 of the CDV 4 is connected to an outgoing section 20B of the coolant line 20. An armature 35 is located within a solenoid coil 36 and biased downwards away from a fixed core 40 by a spring 37. A seal 41 is provided at a lower end of the armature 35 for sealing an orifice 39 of the CDV 4. A shuttle frame 38 is captured on the lower end of the armature 35. The shuttle frame 38 is also engaged with a diaphragm 32 of the CDV 4. When the CDV 4 is closed the diaphragm 32 sealingly engages against a main valve seat 42. The diaphragm 32 also defines a pilot chamber 34 above the diaphragm 32. A bleed hole 33 is provided in the diaphragm 32 to permit flow of fluid into the pilot chamber 34 above the diaphragm 32 from the inlet 30 when the CDV 4 is closed.

When the solenoid coil 36 is de-energised the CDV 4 is closed by engagement of the seal 41 against the orifice 39 under action of the spring 37 and the engagement of the diaphragm 32 against the main valve seat 42. At the same time the pilot chamber 34 is open to the relatively high pressure of the inlet 30 via the bleed hole 33 such that the fluid pressure in the pilot chamber 34 increases the closing force.

When the solenoid coil 36 is energised the armature 35 is lifted, compressing the spring 37, which in turn lifts the diaphragm 32 into a partially open position due to lifting of the shuttle frame 38 by the armature 35. The orifice 39 is thereby opened by the disengagement of the seal 41. Fluid pressure in the pilot chamber 34 is reduced due to the faster outflow of fluid from the pilot chamber 34 via the orifice 39 compared to inflow of fluid into the pilot chamber 34 via the bleed hole 33. Consequently the differential pressure across the diaphragm 32 (higher below) assists in lifting and retaining the diaphragm 32 in its fully open position in which the diaphragm 32 is unsealed from the main valve seat 42. Thus, fluid flow is established from the inlet 30 to the outlet 31. The CDV 4 can be subsequently commanded closed by de-energising the solenoid coil 36 again.

Such valves may become blocked, for example from debris circulating within the apparatus 1. In particular, because the hole sizes and clearances of the valve are small. For example, the orifice 39 may be around 1.0 mm in diameter, the bleed hole 33 around 0.8 mm in diameter, and the radial clearance between the armature 35 and the coil 36 around 0.25 mm. Blockage of the CDV 4 may typically result in the valve remaining open, or partially open, when it should be closed.

Figure 3:
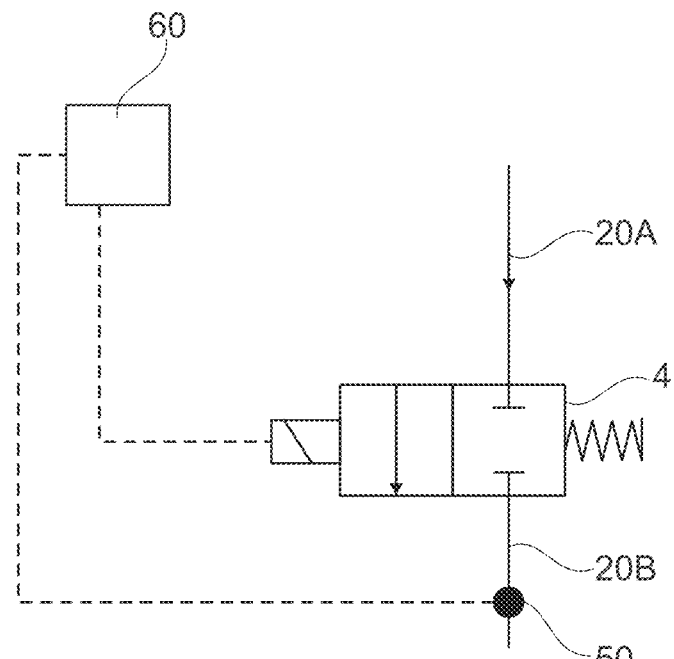
FIG. 3 is a schematic diagram of an embodiment according to the present disclosure comprising a controller operatively connected to a first, downstream, sensor and a CDV.

According to an embodiment of the present disclosure, as illustrated in FIG. 3, the apparatus 1 is modified by providing at least a first sensor 50 for measuring the pressure and/or temperature of the coolant and a controller 60.

The controller 60 is configured to command the CDV 4 to open by energising the CDV 4 and command the CDV 4 to close by de-energising the CDV 4, receive readings from the first sensor 50, and when the CDV 4 is commanded to close, based on the readings from the first sensor 50, determine if the CDV 4 has failed to close.

The first sensor 50 may be located downstream of the CDV 4. Alternatively, the first sensor 50 is located upstream of the CDV 4.

A second sensor 51 for measuring the pressure and/or temperature of the coolant may be provided. The first sensor 50 may be downstream of the CDV 4 and the second sensor 51 may be upstream of the CDV 4, or vice versa.

The first sensor 50 may be a temperature sensor, a pressure sensor or a combined temperature and pressure sensor. The second sensor 51 may be a temperature sensor, a pressure sensor or a combined temperature and pressure sensor. Examples of suitable temperature sensors include—but are not limited to—thermocouples, for example Type K thermocouples. Examples of suitable pressure sensors include—but are not limited to—capacitance or strain gauge based sensors, for example the 320-3062 pressure sensor from Caterpillar, Inc.

The first sensor 50 and/or the second sensor 51 may be integrated with the CDV 4, i.e. provided within or directly coupled to a housing of the CDV 4. Alternatively, the first sensor 50 and/or the second sensor 51 may be separate from the CDV 4. In such cases the first sensor 50 and/or the second sensor 51 may be located proximate the CDV 4, for example on a portion of the coolant line 20 close to the CDV 4, e.g. on or close to the ingoing section 20A and/or outgoing section 20B of the coolant line 20. Alternatively, the first sensor 50 and/or the second sensor 51 may be located more remote from the CDV 4, for example at a more distant point of the coolant line 20.

The controller 60 may be configured to determine if the CDV 4 has failed to close based on changes in the temperature and/or pressure of the coolant when the CDV 4 is commanded to close.

Example 1

FIG. 3 illustrates a portion of an example apparatus 1 wherein a first sensor 50 is located downstream of the CDV 4 in the outgoing section 20B. (However, as noted above the first sensor 50 could be located at a more distal point along the coolant line). The first sensor 50 may be a temperature sensor.

The coolant flowing from the coolant reservoir 2 along coolant line 20 towards the CDV 4 may have a relatively high temperature, e.g. around 80° C. When the CDV 4 is open the first sensor 50 downstream of the CDV 4 will be exposed to the coolant and the temperature reading received by the controller 60 from the first sensor 50 will be high (around 80° C.). When the CDV 4 is closed correctly the coolant will stop flowing past the first sensor 50. Consequently the temperature of the coolant proximate the first sensor 50 will start to cool towards the ambient temperature of the surroundings. However, if the CDV 4 is blocked and fails to close or fully close when commanded to by the controller 60 then coolant will continue to flow past the first sensor 50. As a result, the temperature reading may not decrease significantly (if the CDV 4 fails substantially fully open) or may decrease at a slower than expected rate (if the CDV 4 fails partially open).

The controller 60 may therefore be configured to determine that the CDV 4 has failed to close properly when a temperature of the coolant remains above a threshold temperature and/or when the temperature does not decay towards an ambient temperature at an expected rate when the CDV 4 is de-energised, e.g. the rate of temperature decrease is less than a threshold rate.

Example 2

Figure 4:
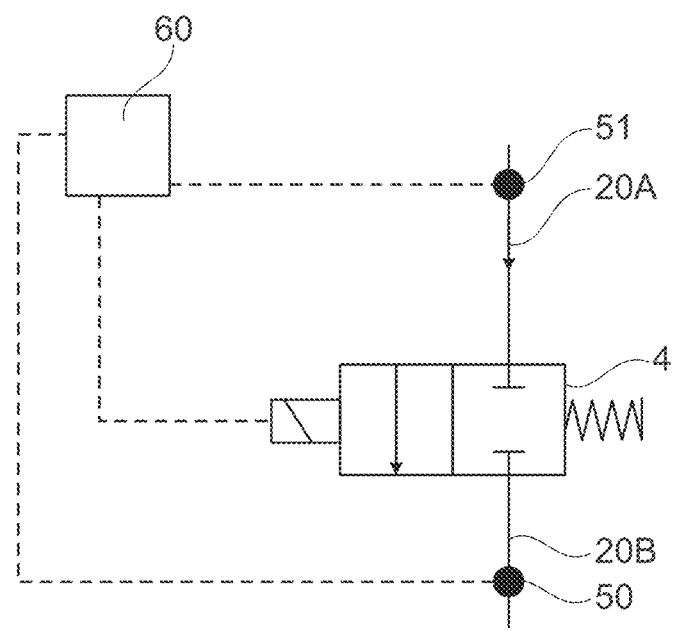
FIG. 4 is a schematic diagram of another embodiment according to the present disclosure comprising a controller operatively connected to a first, upstream, sensor, a second, downstream, sensor and a CDV.

FIG. 4 illustrates a portion of an example apparatus 1 wherein a first sensor 50 is located downstream of the CDV 4 in the outgoing section 20B and a second sensor 51 is located upstream of the CDV 4 in the ingoing section 20A. (However, as noted above the sensors could be located at more distal points along the coolant line). The first sensor 50 and the second sensor 51 may both be temperature sensors.

When the CDV 4 is open the first sensor 50 downstream of the CDV 4 and the second sensor 51 upstream of the CDV 4 will be exposed to the coolant and the temperature readings received by the controller 60 from both sensors will be high (around 80° C.). When the CDV 4 is closed correctly the coolant will stop flowing past the first sensor 50 and second sensor 51. Consequently the temperature of the coolant proximate the first sensor 50 and the second sensor 51 will start to cool towards the ambient temperature of the surroundings. However, if the CDV 4 is blocked and fails to close or fully close when commanded to by the controller 60 then coolant will continue to flow past the first sensor 50 and the second sensor 51. As a result, the temperature readings may not decrease significantly (if the CDV 4 fails substantially fully open) or may decrease at a slower than expected rate (if the CDV 4 fails partially open).

The controller 60 may therefore be configured to determine that the CDV 4 has failed to close properly when a temperature of the coolant as detected by either or both of the first sensor 50 and second sensor 51 remains above a threshold temperature and/or when the temperature detected by either or both of the first sensor 50 and second sensor 51 does not decay towards an ambient temperature at an expected rate when the CDV 4 is de-energised, e.g. the rate of temperature decrease is less than a threshold rate. When the CDV 4 closes properly the temperature reading from the second sensor 51 upstream may decay more slowly than that of the first sensor 50. Thus, the controller 60 may also be configured to use this as basis for determining if the CDV 4 has failed open or partially open.

The use of both the first sensor 50 and the second sensor 51 may increase the reliability and robustness of the determination. In addition, the use of both sensors may reduce the time required for the controller 60 to determine a failed open or partially open status since it may be expected that the temperature response of the first sensor 50 and the second sensor 51 will be the same or similar to one another. Thus, a deviation in the response of one sensor compared to the other (absolute temperature value or relative change in temperature value or rate of change of temperature) may allow a faster determination to be achieved.

Example 3

In this example the arrangement of FIG. 4 is again used but the first sensor 50 and the second sensor 51 are both pressure sensors.

When the CDV 4 is open the first sensor 50 downstream of the CDV 4 and the second sensor 51 upstream of the CDV 4 will be exposed to flowing coolant. The pressure at the location of the second sensor 51 upstream will typically be higher than the pressure at the location of the first sensor 50 downstream due to the pressure drop across the CDV 4. In addition, there will typically be discernible pressure fluctuations due to the flowing of the coolant.

When the CDV 4 is closed correctly the coolant will stop flowing past both the first sensor 50 and the second sensor 51. The pressure at the second sensor 51 upstream will undergo a pressure rise while the pressure at the first sensor 50 downstream will undergo a pressure drop. In addition, the pressure fluctuations mentioned above will be eliminated or reduced. However, if the CDV 4 is blocked and fails to close or fully close when commanded to by the controller 60 then coolant will continue to flow past the first sensor 50 and the second sensor 51. As a result, the pressure readings may not increase or decrease as expected.

The controller 60 may therefore be configured to determine that the CDV 4 has failed to close properly when one or more of the following occur:
the pressure at the second sensor 51 upstream fails to rise by a threshold amount;
the pressure at the first sensor 50 downstream fails to drop by a threshold amount;
pressure fluctuations continue to be detected.

Example 4

Figure 5:
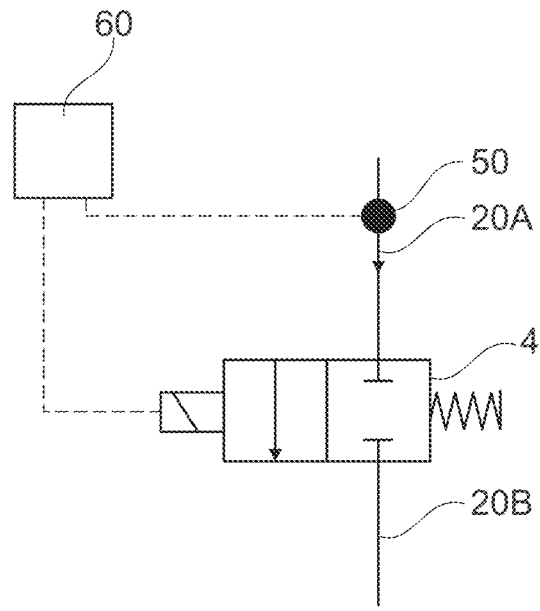
FIG. 5 is a schematic diagram of another embodiment according to the present disclosure comprising a controller operatively connected to a first, upstream, sensor and a CDV.
Figures 6A, 6B:
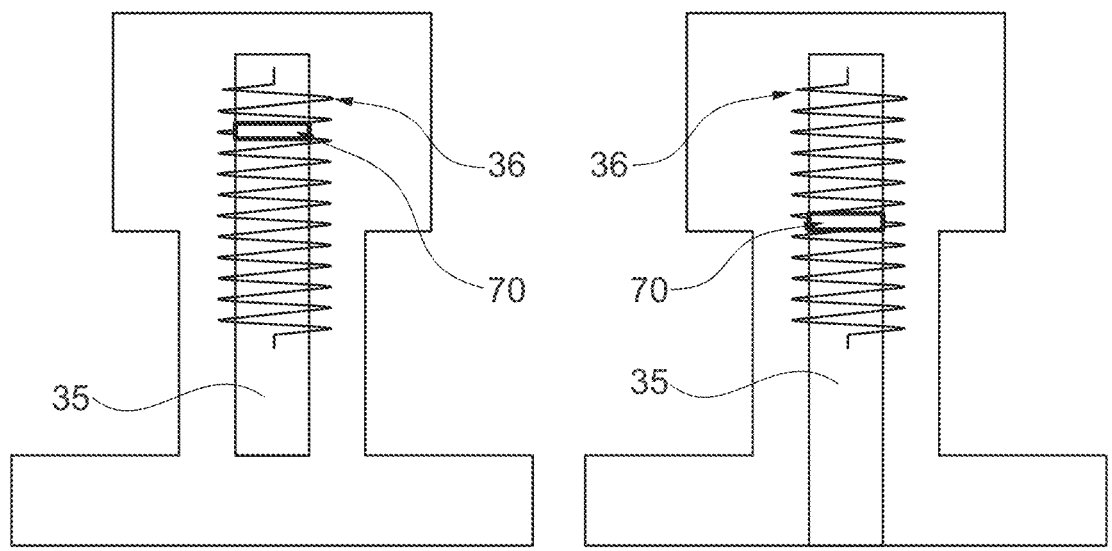
FIG. 6a is a schematic illustration of a solenoid armature and solenoid coil of an embodiment of a CDV in an open state.
FIG. 6b is a schematic illustration of the solenoid armature and solenoid coil of the CDV of FIG. 6a in a closed state.

FIG. 5 illustrates a portion of an example apparatus 1 wherein a first sensor 50 is located upstream of the CDV 4 in the ingoing section 20A. (However, as noted above the first sensor 50 could be located at a more distal point along the coolant line). The first sensor 50 may be a temperature sensor.

The coolant flowing from the coolant reservoir 2 along coolant line 20 towards the CDV 4 may have a relatively high temperature, e.g. around 80° C. When the CDV 4 is open the first sensor 50 upstream of the CDV 4 will be exposed to the coolant and the temperature reading received by the controller 60 from the first sensor 50 will be high (around 80° C.). When the CDV 4 is closed correctly the coolant will stop flowing past the first sensor 50. Consequently the temperature of the coolant proximate the first sensor 50 will start to cool towards the ambient temperature of the surroundings. However, if the CDV 4 is blocked and fails to close or fully close when commanded to by the controller 60 then coolant will continue to flow past the first sensor 50. As a result, the temperature reading may not decrease significantly (if the CDV 4 fails substantially fully open) or may decrease at a slower than expected rate (if the CDV 4 fails partially open).

The controller 60 may therefore be configured to determine that the CDV 4 has failed to close properly when a temperature of the coolant remains above a threshold temperature and/or when the temperature does not decay towards an ambient temperature at an expected rate when the CDV 4 is de-energised, e.g. the rate of temperature decrease is less than a threshold rate.

Example 5

In this example the arrangement of FIG. 5 is again used but the first sensor 50 is a pressure sensor.

When the CDV 4 is open the first sensor 50 upstream of the CDV 4 will be exposed to flowing coolant. There will typically be discernible pressure fluctuations due to the flowing of the coolant.

When the CDV 4 is closed correctly the coolant will stop flowing past the first sensor 50. The pressure at the first sensor 50 upstream will undergo a pressure rise. In addition, the pressure fluctuations mentioned above will be eliminated or reduced. However, if the CDV 4 is blocked and fails to close or fully close when commanded to by the controller 60 then coolant will continue to flow past the first sensor 50. As a result, the pressure readings may not increase as expected.

The controller 60 may therefore be configured to determine that the CDV 4 has failed to close properly when one or more of the following occur:
the pressure at the first sensor 50 upstream fails to rise by a threshold amount;
pressure fluctuations continue to be detected.

In any of the above embodiments, the apparatus 1 may further comprise a locator element 70 on the solenoid armature 35 of the CDV 4. The locator element 70 may be a magnetic element or a bimetallic element. The locater element 70 may be fixedly mounted to the surface of the solenoid armature 35, or be integrated with and/or form a part of the solenoid armature 35. The locator element 70 may be constrained to move in sync with the solenoid armature 35.

The controller 60 may be configured to detect current and/or voltage fluctuations in the solenoid coil 36 of the CDV 4 caused by relative movement of the locator element 70 and the solenoid coil 36. For example, the controller 60 may determine how far downwards the locator element 70 (and hence the solenoid armature 35) has moved when closure of the CDV 4 is commanded. This may be used to determine or confirm whether the CDV 4 has fully closed.

In some embodiments the first sensor 50 and/or the second sensor 51 may be omitted and the controller 60 may determine whether the CDV 4 has failed to close when the CDV 4 is de-energised based only on detecting a position of the valve element of the CDV 4 based on detecting a location of the solenoid armature 35 of the CDV using the locator element 70.

In any of the above embodiments of the present disclosure, the CDV may be for example a 2 way 2 position normally closed valve.

In any of the embodiments of the present disclosure, the coolant may be for example water, ethylene glycol or a mixture of the same.

In any of the embodiments of the present disclosure, the coolant reservoir may be for example an engine header coolant tank, or a whole or a part of a cylinder block or cylinder head of an engine.

In any of the embodiments of the present disclosure, the controller 60 may be operatively connected to the CDV 4 and/or the first sensor 50 and/or the second sensor 51 by wired or wireless connections. The controller 60 may comprise hardware and/or software. The controller 60 may comprise a control unit or may be a computer program running on a dedicated or shared computing resource. The controller 60 may comprise a single unit or may be composed of a plurality of sub-units that are operatively connected. The controller 60 may be located on one processing resource or may be distributed across spatially separate computing resources. The controller 60 may comprise one or more programmable and or non-programmable memory units or sub-units. The controller 60 may comprise data storage and handling units or sub-units. The controller 60 may comprise or form part of an engine electronic control module (ECM) operatively connected to an engine.

INDUSTRIAL APPLICABILITY

The present disclosure provides a method of fault detection of a coolant diverter valve (CDV), the method comprising:

arranging the CDV in a coolant system to control flow of coolant from a coolant reservoir to a diesel exhaust fluid (DEF) tank;

providing a first sensor for measuring the pressure and/or temperature of the coolant;

operating the CDV by, as required from time to time, commanding the CDV to open by energising the CDV and commanding the CDV to close by de-energising the CDV; and based on readings from the first sensor determining if the CDV has failed to close when the CDV is de-energised.

Determining that the CDV has failed to close properly can result in raising a fault flag and making an operator (local to or remote from the system) aware that the DEF fluid temperature is higher than intended. DEF fluid at higher temperatures can be corrosive and can also decompose faster to ammonia which can permeate through components and damage electrical circuits. They can also lead to deposits that can damage components. It is therefore desirable to diagnose a failed CDV valve as soon as possible.

The first sensor may measure the pressure and/or temperature of the coolant upstream of the CDV. Alternatively the first sensor may measure the pressure and/or temperature of the coolant downstream of the CDV.

The first sensor may measure the temperature of the coolant and the controller may determine that the CDV has failed to close based on determining that a temperature of the coolant remains above a threshold temperature and/or does not decay towards an ambient temperature at an expected rate when the CDV is de-energised.

The first sensor may measure the pressure of the coolant and the controller may determine that the CDV has failed to close based on whether an expected pressure change occurs when the CDV is de-energised.

A second sensor for measuring the pressure and/or temperature of the coolant may be provided, one of the first and second sensors being upstream of the CDV and the other of the first and second sensors being downstream of the CDV.

A controller may be provided to control operation of the CDV.

The CDV may comprise a 2 way 2 position normally closed valve.

A position of a valve element of the CDV may be detected, wherein the controller may determine or confirm that the CDV has failed to close when the CDV is de-energised based on a detected position of the valve element.

The position of the valve element may be detected by detecting a location of a solenoid armature of the CDV.

A locator element may be provided on the solenoid armature for detecting current and/or voltage fluctuations in a solenoid coil of the CDV caused by relative movement of the locator element and the solenoid coil.

The present disclosure further provides apparatus for controlling the temperature of diesel exhaust fluid (DEF) in a DEF tank, the apparatus comprising:

a coolant reservoir containing coolant;

a DEF tank for holding an aqueous urea solution for injection into an exhaust system;

a coolant diverter valve (CDV);

coolant lines for circulating the coolant from the coolant reservoir via the CDV and the DEF tank and back to the coolant reservoir;

a first sensor for measuring the pressure and/or temperature of the coolant; and a controller configured to:
command the CDV to open by energising the CDV and command the CDV to close by de-energising the CDV;
receive readings from the first sensor; and
when the CDV is commanded to close, based on the readings from the first sensor, determine if the CDV has failed to close.

The first sensor may be located upstream of the CDV. Alternatively, the first sensor may be located downstream of the CDV.

The first sensor may be a temperature sensor and the controller may be configured to determine that the CDV has failed to close based on determining that a temperature of the coolant remains above a threshold temperature and/or does not decay towards an ambient temperature at an expected rate when the CDV is de-energised.

The first sensor may be a pressure sensor and the controller may be configured to determine that the CDV has failed to close based on whether an expected pressure change occurs when the CDV is de-energised.

The apparatus may further comprise a second sensor for measuring the pressure and/or temperature of the coolant, one of the first and second sensors being upstream of the CDV and the other of the first and second sensors being downstream of the CDV.

The coolant reservoir may be an engine header coolant tank, or a whole or a part of a cylinder block or cylinder head of an engine.

The CDV may comprise a 2 way 2 position normally closed valve.

The apparatus may further comprise providing a locator element on a solenoid armature of the CDV and detecting current and/or voltage fluctuations in a solenoid coil of the CDV caused by relative movement of the locator element and the solenoid coil.

The present disclosure further provides a method of fault detection of a coolant diverter valve (CDV), the method comprising:

arranging the CDV in a coolant system to control flow of coolant from a coolant reservoir to a diesel exhaust fluid (DEF) tank;

operating the CDV by, as required from time to time, commanding the CDV to open by energising the CDV and commanding the CDV to close by de-energising the CDV;

determining if the CDV has failed to close when the CDV is de-energised based on detecting a position of a valve element of the CDV based on detecting a location of a solenoid armature of the CDV.

The method may further comprise providing a locator element on the solenoid armature and detecting current and/or voltage fluctuations in a solenoid coil of the CDV caused by relative movement of the locator element and the solenoid coil.

The locator element may be a magnetic element or a bimetallic element.

The CDV may comprise a 2 way 2 position normally closed valve.

The present disclosure further provides apparatus for controlling the temperature of diesel exhaust fluid (DEF) in a DEF tank, the apparatus comprising:

a coolant reservoir containing coolant;

a DEF tank for holding an aqueous urea solution for injection into an exhaust system;

a coolant diverter valve (CDV) comprising a valve element movable by a solenoid armature;

coolant lines for circulating the coolant from the coolant reservoir via the CDV and the DEF tank and back to the coolant reservoir;

a controller configured to:
command the CDV to open by energising the CDV and command the CDV to close by de-energising the CDV; and
when the CDV is commanded to close, based on detecting a location of the solenoid armature, determine if the CDV has failed to close.

The apparatus may further comprise providing a locator element on the solenoid armature and detecting current and/or voltage fluctuations in a solenoid coil of the CDV caused by relative movement of the locator element and the solenoid coil.

The locator element may be a magnetic element or a bimetallic element.

The CDV may comprise a 2 way 2 position normally closed valve.

The apparatus finds application for engines, preferably for diesel internal combustion engines and in particular for diesel internal combustion engines that store DEF in a DEF tank.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

What is claimed is:

1. A method of fault detection of a coolant diverter valve, the method comprising:
arranging the coolant diverter valve in a coolant system to control flow of coolant from a coolant reservoir to a diesel exhaust fluid tank;
providing a first sensor for measuring the pressure and/or temperature of the coolant;
operating the coolant diverter valve by, as required from time to time, commanding the coolant diverter valve to open by energising the coolant diverter valve and commanding the coolant diverter valve to close by de-energising the coolant diverter valve; and
based on readings from the first sensor determining if the coolant diverter valve has failed to close when the coolant diverter valve is de-energised.

2. The method of claim 1, wherein the first sensor measures the pressure and/or temperature of the coolant upstream of the coolant diverter valve; or wherein the first sensor measures the pressure and/or temperature of the coolant downstream of the coolant diverter valve.

3. The method of claim 1, wherein the first sensor measures the temperature of the coolant and the controller determines that the coolant diverter valve has failed to close based on determining that a temperature of the coolant remains above a threshold temperature and/or does not decay towards an ambient temperature at an expected rate when the coolant diverter valve is de-energised.

4. The method of claim 1, wherein the first sensor measures the pressure of the coolant and the controller determines that the coolant diverter valve has failed to close based on whether an expected pressure change occurs when the coolant diverter valve is de-energised.

5. The method of claim 1, providing a second sensor for measuring the pressure and/or temperature of the coolant, one of the first and second sensors being upstream of the coolant diverter valve and the other of the first and second sensors being downstream of the coolant diverter valve.

6. The method of claim 1, further comprising providing a controller to control operation of the coolant diverter valve.

7. The method of claim 1, wherein the coolant diverter valve comprises a 2 way 2 position normally closed valve.

8. The method of claim 1, further comprising detecting a position of a valve element of the coolant diverter valve, wherein the controller determines or confirms that the coolant diverter valve has failed to close when the coolant diverter valve is de-energised based on a detected position of the valve element.

9. The method of claim 8, wherein the position of the valve element is detecting by detecting a location of a solenoid armature of the coolant diverter valve.

10. The method of claim 9, further comprising providing a locator element on the solenoid armature and detecting current and/or voltage fluctuations in a solenoid coil of the coolant diverter valve caused by relative movement of the locator element and the solenoid coil.

11. Apparatus for controlling the temperature of diesel exhaust fluid in a diesel exhaust fluid tank, the apparatus comprising:
a coolant reservoir containing coolant;
a diesel exhaust fluid tank for holding an aqueous urea solution for injection into an exhaust system;
a coolant diverter valve;
coolant lines for circulating the coolant from the coolant reservoir via the coolant diverter valve and the diesel exhaust fluid tank and back to the coolant reservoir;
a first sensor for measuring the pressure and/or temperature of the coolant; and
a controller configured to:
command the coolant diverter valve to open by energising the coolant diverter valve and command the coolant diverter valve to close by de-energising the coolant diverter valve;
receive readings from the first sensor; and
when the coolant diverter valve is commanded to close, based on the readings from the first sensor, determine if the coolant diverter valve has failed to close.

12. The apparatus of claim 11, wherein the first sensor is located upstream of the coolant diverter valve; or wherein the first sensor is located downstream of the coolant diverter valve.

13. The apparatus of claim 11, wherein the first sensor is a temperature sensor and the controller is configured to determine that the coolant diverter valve has failed to close based on determining that a temperature of the coolant remains above a threshold temperature and/or does not decay towards an ambient temperature at an expected rate when the coolant diverter valve is de-energised.

14. The apparatus of claim 11, wherein the first sensor is a pressure sensor and the controller is configured to determine that the coolant diverter valve has failed to close based on whether an expected pressure change occurs when the coolant diverter valve is de-energised.

15. The apparatus of claim 11, further comprising a second sensor for measuring the pressure and/or temperature of the coolant, one of the first and second sensors being upstream of the coolant diverter valve and the other of the first and second sensors being downstream of the coolant diverter valve.

16. The apparatus of claim 11, wherein the coolant reservoir is an engine header coolant tank, or a whole or a part of a cylinder block or cylinder head of an engine.

17. The apparatus of claim 11, wherein the coolant diverter valve comprises a 2 way 2 position normally closed valve.

18. The apparatus of claim 11, further comprising providing a locator element on a solenoid armature of the coolant diverter valve and detecting current and/or voltage fluctuations in a solenoid coil of the coolant diverter valve caused by relative movement of the locator element and the solenoid coil.

19. Apparatus for controlling the temperature of diesel exhaust fluid in a diesel exhaust fluid tank, the apparatus comprising:
  a coolant reservoir containing coolant;
  a diesel exhaust fluid tank for holding an aqueous urea solution for injection into an exhaust system;
  a coolant diverter valve comprising a valve element movable by a solenoid armature;
  coolant lines for circulating the coolant from the coolant reservoir via the coolant diverter valve and the diesel exhaust fluid tank and back to the coolant reservoir;
  a controller configured to:
    command the coolant diverter valve to open by energising the coolant diverter valve and command the coolant diverter valve to close by de-energising the coolant diverter valve; and
    when the coolant diverter valve is commanded to close, based on detecting a location of the solenoid armature, determine if the coolant diverter valve has failed to close.

20. The apparatus of claim 19, further comprising providing a locator element on the solenoid armature and detecting current and/or voltage fluctuations in a solenoid coil of the coolant diverter valve caused by relative movement of the locator element and the solenoid coil;
  and optionally wherein the locator element is a magnetic element or a bimetallic element; and/or optionally wherein the coolant diverter valve comprises a 2 way 2 position normally closed valve.

* * * * *